United States Patent
Rapanen et al.

(10) Patent No.: US 11,048,686 B2
(45) Date of Patent: Jun. 29, 2021

(54) METHOD AND A NODE FOR STORAGE OF DATA IN A NETWORK

(71) Applicant: Telia Company AB, Solna (SE)

(72) Inventors: Joni Rapanen, Vantaa (FI); Tomi Sarajisto, Helskinki (FI); Ilkka Keisala, Helsinki (FI)

(73) Assignee: Telia Company AB, Solna (SE)

( * ) Notice: Subject to any disclaimer, the term of this patent is extended or adjusted under 35 U.S.C. 154(b) by 138 days.

(21) Appl. No.: 16/228,956

(22) Filed: Dec. 21, 2018

(65) Prior Publication Data

US 2019/0213182 A1    Jul. 11, 2019

(30) Foreign Application Priority Data

Jan. 5, 2018    (SE) .................................... 1850015-7

(51) Int. Cl.
*G06F 16/23*    (2019.01)
*H04L 9/06*    (2006.01)
(Continued)

(52) U.S. Cl.
CPC ...... *G06F 16/2365* (2019.01); *G06F 16/2379* (2019.01); *G06F 21/6227* (2013.01);
(Continued)

(58) Field of Classification Search
CPC ............. G06F 16/2365; G06F 16/2379; G06F 16/2397; H04L 43/04; H04L 9/0637; H04L 2209/38
(Continued)

(56) References Cited

U.S. PATENT DOCUMENTS 4,994,971 A * 2/1991 Poelstra .................. G06F 30/18
701/29.6
8,364,141 B1 * 1/2013 Kateley ................. H04W 24/08
455/423

(Continued)

FOREIGN PATENT DOCUMENTS

CN    107332900 A  * 11/2017
CN    107332900 A    11/2017
(Continued)

OTHER PUBLICATIONS

Bhamare et al., "A Survey on Service Function Chaining", Journal of Network and Computer Applications, vol. 75, 2016, pp. 138-155. (Year: 2016).*
(Continued)

*Primary Examiner* — Phuong Thao Cao
(74) *Attorney, Agent, or Firm* — Burr & Forman LLP; Jeffrey H. Kamenetsky

(57) ABSTRACT

The embodiments herein relate to a network node and a method performed in the network node of an operator, for storage of data in a blockchain database in a network that is based on a Service Function Chaining (SFC) architecture, the method comprising: receiving data packets from an IoT device; performing, by a service function in the network node, at least deep packet inspection, DPI, on the received data packets for identifying sensor data of the received data packets; retrieving, from the operator's system, network data associated with the sensor data; retrieving, from a third party system, external data associated with the sensor data; combining the identified sensor data, the network data and the external data to form a combined data; and storing the combined data in the blockchain database.

12 Claims, 6 Drawing Sheets

(51) Int. Cl.
   H04L 12/26      (2006.01)
   H04L 9/32       (2006.01)
   H04W 4/70       (2018.01)
   H04L 29/06      (2006.01)
   G06F 21/78      (2013.01)
   G06F 21/62      (2013.01)

(52) U.S. Cl.
   CPC ............ *G06F 21/78* (2013.01); *H04L 9/0637* (2013.01); *H04L 9/3239* (2013.01); *H04L 9/3297* (2013.01); *H04L 43/04* (2013.01); *H04L 63/0245* (2013.01); *H04W 4/70* (2018.02); *H04L 43/08* (2013.01); *H04L 2209/38* (2013.01); *H04L 2209/805* (2013.01)

(58) Field of Classification Search
   USPC ........................................................ 707/703
   See application file for complete search history.

(56) References Cited

U.S. PATENT DOCUMENTS

| | | | | |
|---|---|---|---|---|
| 9,781,141 | B2* | 10/2017 | Barkan | G06F 21/561 |
| 9,792,736 | B1* | 10/2017 | Koebler | B60L 8/003 |
| 10,264,003 | B1* | 4/2019 | Wu | G06N 20/00 |
| 10,396,993 | B2* | 8/2019 | Aranda Gutierrez | H04L 9/3239 |
| 10,719,501 | B1* | 7/2020 | Leise | H04L 9/3239 |
| 2005/0246282 | A1* | 11/2005 | Naslund | H04L 63/0823 705/52 |
| 2007/0049250 | A1* | 3/2007 | Chambers | H04L 63/126 455/411 |
| 2013/0243189 | A1* | 9/2013 | Ekberg | H04L 9/3297 380/44 |
| 2014/0193154 | A1* | 7/2014 | Graham | H04L 43/14 398/79 |
| 2015/0195176 | A1* | 7/2015 | Vasseur | H04L 43/12 709/224 |
| 2015/0319030 | A1* | 11/2015 | Nachum | H04L 43/00 370/250 |
| 2015/0330645 | A1* | 11/2015 | Speranzon | G06Q 10/04 700/276 |
| 2015/0341285 | A1* | 11/2015 | Aysola | H04L 12/6418 370/392 |
| 2015/0351687 | A1* | 12/2015 | Kim | H04W 4/80 600/301 |
| 2016/0094398 | A1* | 3/2016 | Choudhury | H04L 45/42 370/254 |
| 2016/0363935 | A1* | 12/2016 | Shuster | G08G 1/163 |
| 2017/0046664 | A1* | 2/2017 | Haldenby | G06Q 20/0655 |
| 2017/0180257 | A1* | 6/2017 | Guichard | H04L 47/125 |
| 2017/0295021 | A1* | 10/2017 | Aranda Gutierrez | H04L 63/12 |
| 2017/0346752 | A1* | 11/2017 | Krishnamurthy | H04L 45/306 |
| 2018/0096752 | A1* | 4/2018 | Ovalle | G07F 17/3209 |
| 2018/0212970 | A1* | 7/2018 | Chen | H04L 63/101 |
| 2018/0220278 | A1* | 8/2018 | Tal | G06Q 20/065 |
| 2018/0285810 | A1* | 10/2018 | Ramachandran | G06F 16/27 |
| 2018/0357603 | A1* | 12/2018 | Wilkinson | G07C 5/008 |
| 2019/0013948 | A1* | 1/2019 | Mercuri | G06F 9/542 |
| 2019/0058709 | A1* | 2/2019 | Kempf | H04L 9/3226 |
| 2019/0059066 | A1* | 2/2019 | Harmatos | H04J 3/0667 |
| 2019/0116158 | A1* | 4/2019 | Patil | H04L 69/22 |
| 2019/0123985 | A1* | 4/2019 | Rao | H04L 41/14 |
| 2019/0364492 | A1* | 11/2019 | Azizi | H04W 52/0264 |
| 2019/0392064 | A1* | 12/2019 | Swope | H04L 9/3239 |
| 2020/0053169 | A1* | 2/2020 | Mani | H04L 61/1541 |
| 2020/0064783 | A1* | 2/2020 | Tran | G06F 21/602 |
| 2020/0084217 | A1* | 3/2020 | Judka | G06F 21/6218 |
| 2020/0145219 | A1* | 5/2020 | Sebastian | H04L 63/0861 |
| 2020/0169618 | A1* | 5/2020 | Yamane | G06N 3/04 |

FOREIGN PATENT DOCUMENTS

| | | | | |
|---|---|---|---|---|
| CN | 107528856 | A | * 12/2017 | |
| CN | 107528856 | A | 12/2017 | |
| EP | 3229418 | A1 | * 10/2017 | ............ H04L 47/34 |
| EP | 3229418 | A1 | 10/2017 | |

OTHER PUBLICATIONS

Banafa, A., "IoT and Blockchain Convergence: Benefits and Challenges," IEEE Internet of Things, Jan. 10, 2017, 9 pages, access at <https://iot.ieee.org/newsletter/january-2017/iot-and-blockchain-convergence-benefits-and-challenges.html> . (Year: 2017 ).*

Kataoka et al., "Trust List: Internet-wide and Distributed IoT Traffic Management using Blockchain and SDN," in Proceedings of 2018 IEEE 4th World Forum on Internet of Things (WF-IoT), Feb. 5-8, 2018, pp. 296-301. (Year: 2018).*

Swedish Search Report, App. No. 1850015-7, Sep. 24, 2018, pp. 1-2, Swedish Patent and Registration Office, Stockholm, Sweden, Per Karlsson.

A survey on service function chaining; Journal of Network and Computer Applications, Nov. 1, 2016, Academic Press, New York, NY, US; Deval Bhamare; Raj Jain; Mohammed Samaka; Aiman Erbad doi:10.1016/j.jnca.2016.09.001 ; abstract; section 1,2.

* cited by examiner

METHOD AND A NODE FOR STORAGE OF DATA IN A NETWORK

TECHNICAL FIELD

The present disclosure generally relates to data communications and more particularly to a method and a system for storage and sharing of data in a blockchain database in a network that is based on a service function chaining architecture.

BACKGROUND

Blockchain is a distributed ledger in which transactions are sequentially grouped into blocks. Each block is linked or chained to the previous block and immutably recorded across a per-to-peer network using cryptographic trust and assurance mechanisms. Blockchains may be deployed with varied levels of governance including public, private and community. Blockchain-based solutions differ from legacy technology and processes. Blockchain may be applied in several areas such as: identity registration and verification; ensuring integrity of devices; enabling identity data sharing while preserving privacy; mitigating trust and transparency issues by using the distributed/decentralized model and enhancing the ability to handle identities, attributes and relationships at massive scale.

The blockchain architecture gives participants the ability to share a ledger that is updated, through peer-to-peer replication, every time a transaction occurs. Peer-to-peer replication means that each participant (node) in the network acts as both a publisher and a subscriber. Each node can receive and send transactions to other nodes, and the data is synchronized across the network as it is transferred. What has changed is that the transaction record is shared and available to all parties (nodes).

Network Function Virtualization (NFV) services can be used with the next generation Wide Area Network (WAN) services that embed functionalities that were previously delivered by dedicated hardware appliances into network provider's points of presence as software services. Functionality that can be delivered this way include, e.g., firewalls, intrusion prevention, WAN optimization and routing.

NFV may also be seen as a network architecture concept that uses the technologies of IT virtualization to visualize entire classes of network node functions into building blocks that may connect, or chain together to create communication services. That is one reason why blockchain technology can be used is a NFV network architecture.

Operators around the globe have launched commercial network services based on NFV. They are typically offering a suite of network-hosted services, including such functions as routing, VPN (Virtual Private network) tunnel termination, load balancing, WAN optimization, firewalling, Intrusion Detection Systems Protection System (IDS/IPS), Secure Web Gateway (SGW) and enterprise session boarder controller. In the near future, it is expected enterprises will be able to run software of their choice in the provider's networks, allowing them to use specialist vendors not supported by the Network Service Provider (NSP) or their own applications for capabilities, such as Internet-of-Things (IoT) data collection.

The number of IoT devices is expected to reach billions. These devices have very low computing power as a complex system is not considered to perform most IoT tasks. Example of such an IoT device is a sensor device such as a temperature sensor, a tracking device, a metering device, etc., with the capability to connect to the Internet. Many IoT devices comprise a microcontroller, sensors and SIM modules for wireless communications. Since the IoT devices typically are very simple devices, they do not have the processing power needed for performing encryption/decryption of data. Data originating from an IoT device may be stored in an IoT platform but said data is restricted to a specific type of information that normally relates to the function of the IoT device, e.g., temperature data, timestamp, etc. However, such IoT generated data is not trackable in a network and also can be easily manipulated since it is not protected.

A solution is therefore needed to enrich the IoT generated data and protect it in a network architecture that makes use of the blockchain technology.

SUMMARY

It is an object of embodiments herein to solve the above problems by providing a method and a system for storage of data in a blockchain database in a network that is based on a Service Function Chaining (SFC) architecture, thereby allowing IoT generated data to be combined with network data and external data in a secure and trackable way.

According to an aspect of some embodiments herein, there is provided a method performed by a network node of an operator for storage of data in a blockchain database in a network that is based on a Service Function Chaining (SFC) architecture, the method comprising: receiving data packets from an IoT device; performing, by a service function in the network node, at least deep packet inspection, DPI, on the received data packets for identifying sensor data of the received data packets; retrieving, from the operator's system, network data associated with the sensor data; retrieving, from a third party system, external data associated with the sensor data; combining the identified sensor data, the network data and the external data to form a combined data; and storing the combined data in the blockchain database.

According to another aspect of some embodiment herein, there is provided a network node for storage of data in a blockchain database in a network that is based on a SFC architecture, the network node comprising a processor and a memory containing instructions executable by the processor, wherein the network node is operative to: receive data packets from an IoT device; perform, by a service function in the network node, at least deep packet inspection, DPI, on the received data packets for identifying sensor data of the received data packets; retrieve, from the operator's system, network data associated with the sensor data; retrieve, from a third party system, external data associated with the sensor data; combine the identified sensor data, the network data and the external data to form a combined data; and store the combined data in the blockchain database.

Several advantages can be achieved by the embodiments herein. An advantage is to enrich IoT generated sensor data with network data and external data and store the combined data in a blockchain database. This enables full chronology of events to be tracked, allowing parties having access to the database to trace or audit prior transactions in a secure manner.

Another advantage is that sensor data, network data and external data can be shared among the parties making fraud more difficult since a blockchain facilitates secure online transactions.

BRIEF DESCRIPTION OF THE DRAWINGS

Example of embodiments herein are described in more detail with reference to attached drawings in which.

DETAILED DESCRIPTION

In the following, a detailed description of the exemplary embodiments is presented in conjunction with the drawings to enable easier understanding of the solutions(s) described herein.

As previously mentioned, the embodiments herein may be applied in a network or network scenario that is based on a Service Function Chaining (SFC) architecture. SFC defines an ordered set of service functions and ordering constraints that are an application to packets and/or frames and/or flows selected as a result of classification. An example of an abstract service function is a "firewall." A service function is responsible for a specific treatment of received packets and can act at various layers of a protocol stack (e.g., at the network layer or other OSI layers). As a logical component, a service function can be realized as a virtual element or be embedded in a physical network node/entity. Several service functions can be embedded in the same network node. Multiple occurrences of a service function can exist in the same administrative domain. Further, one or more service functions can be involved in the delivery of added-value services. A non-exhaustive list of abstract service functions includes: firewalls, WAN and application acceleration, DPI, Lawful Interception (LI), service load balancing, Network Address Translation (NAT), HOST-ID injection, HTTP Header Enrichment functions and TCP optimizer.

Figure 1:
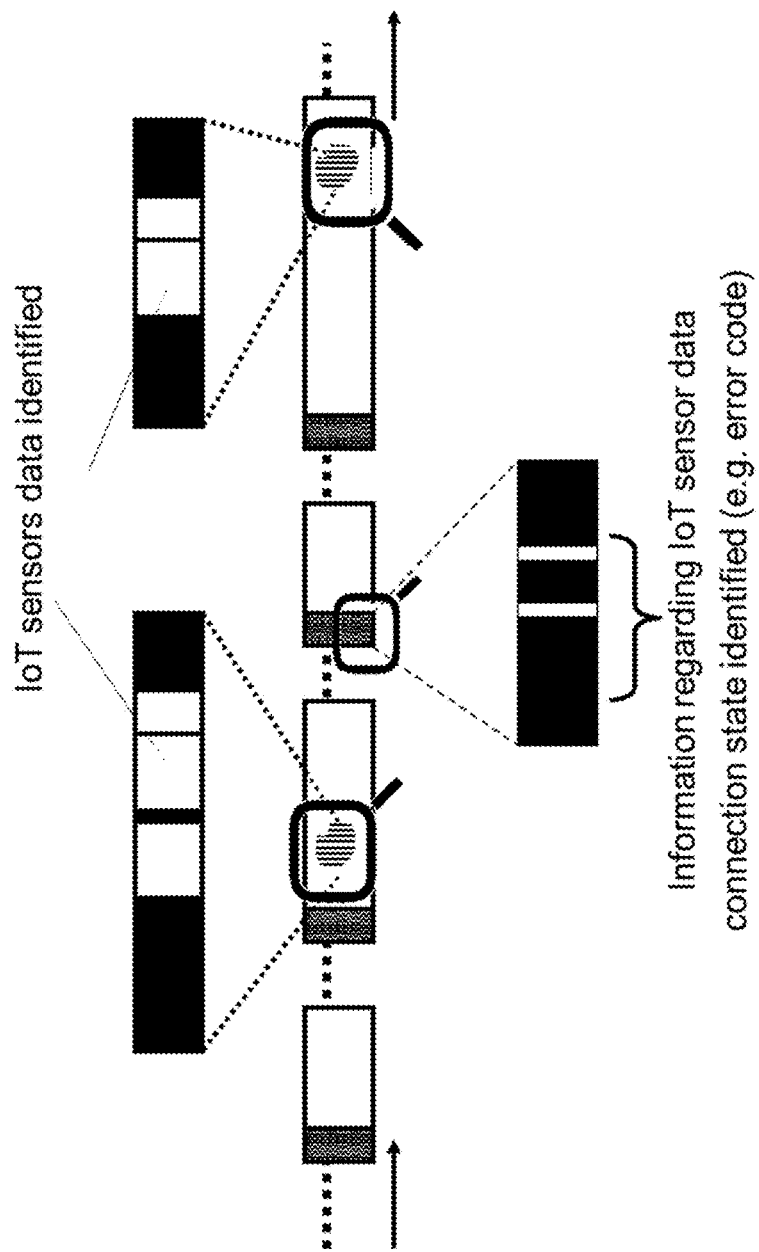
FIG. 1 illustrates a schematic overview of DPI.

In the context of the present embodiments, at least DPI is performed on the data received by the DPI service function of a network node from an IoT device. Lawful Intercept may also be performed. DPI is performed on the basis of the payload of the received data. The data may be a single data packet or a traffic stream. The DPI function has a protocol analyzer which can organize captured data (or packets) by layer and protocol. The analyzer can organize a protocol by its most definitive layer—the upper layer—and give access to the captured data information on a field-by-field basis. For example, a protocol analyzer can recognize more than 300 distinct protocols (e.g., TCP). FIG. 1 illustrates a simplified example of DPI performed on an incoming traffic stream composed of data packets. As shown, a packet stream may include IoT data in one or several data packets. DPI can be performed on one or several data packets to identify IoT sensor data which corresponds to the payload of the data packet. In the header of the data packet, information regarding or associated with the IoT sensor data can also be identified (as shown). The information in the header may include the protocol related to errors/status, i.e., the connection state is also identified.

Hence, the DPI and packet filtering are used for examination of the sensor data payload (and possibly protocol headers and status messages) of an IP packet as it passes an inspection point on an operator network. The detection of relevant data can be done based on packet headers, data protocol structures or the payload of the IoT sensor data.

Figure 2:
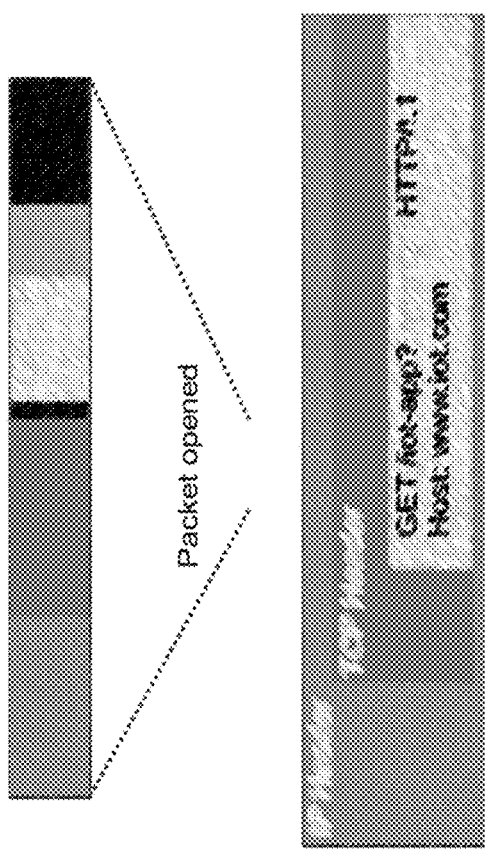
FIG. 2 illustrates an example of the content of sensor data.

An example of how the sensor data is identified from the http traffic is shown in FIG. 2. As shown, the payload includes information, e.g., "GET/IoT-app?temp=23 HTTP/1.1 Host: www.iot.com"

Figure 3:
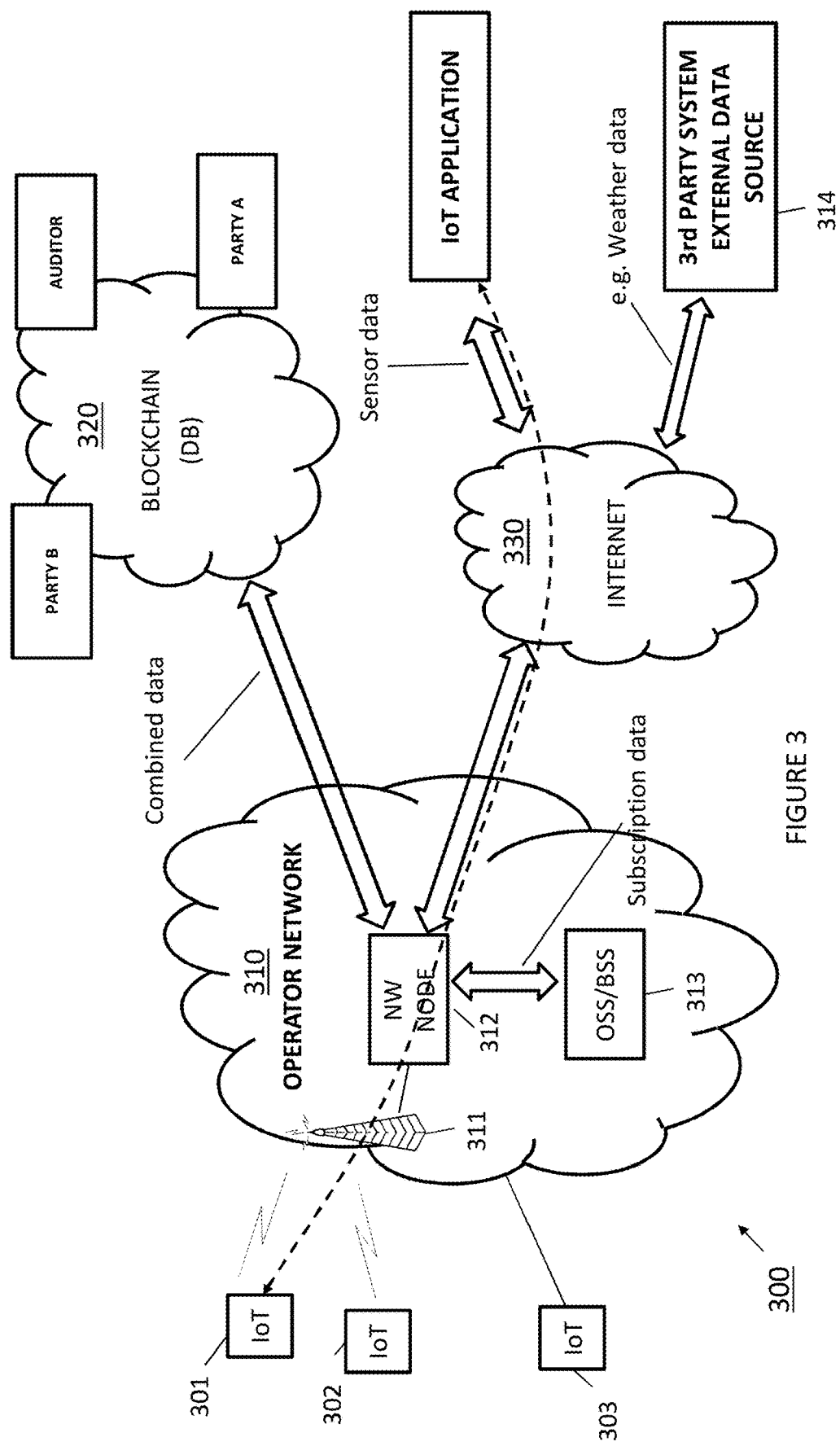
FIG. 3 illustrates a network scenario wherein embodiments herein may be employed.

Referring to FIG. 3 there is illustrated a network scenario 300 wherein embodiments of the present disclosure may be employed. The network scenario is based on a SFC architecture.

The network scenario 300 comprises a plurality of IoT devices 301, 302, 303. Examples of an IoT device may be a tracking device, a metering device, a temperature sensor, etc. All devices are provided with capabilities to connect to the Internet 330 via the operator's network 310. IoT devices 301-302 are shown connected to the operator's network wirelessly whereas IoT device 303 is connected via a fixed network connection. The operator's network 310 is shown comprising a radio base station 311 (e.g., eNodeB, eNB, etc.) which may be part of any radio access technology including, 3G, 4G (or LTE), 5G etc. Connected to the radio base station 311 is a network node 312 (NW NODE) which is configured, as will be described, to implement and perform the method in accordance with the embodiments of the present disclosure.

NW NODE 312 resides in the operator's network 310 and is accessible to an OSS/BSS 313 (Operations Support System/Business Support System) of the operator. The operator's network employs BSS typically includes things that support the business aspects (e.g., Customer Relationship Management (CRM), (Partner Relationship Management (PRM), Enterprise Resource Planning (ERP), Analytics, revenue management) while OSS supports the execution of the business with aspects like monitoring, management, and administration of subscriptions; resolution of trouble; billing and/or charging.

The network scenario 300 further comprises a blockchain database (DB) 320 to which several parties have access to (Party A, Party B, Auditor, etc.). The database is a time-stamped, non-repudiable database. It should be mentioned that any number of parties or participants may have access to the blockchain database 320.

The network scenario 300 also comprises a third-party system 314, which in the context of the embodiments herein, is an external source of data, e.g., weather data, road conditions data, location-specific information or location information, etc.

According to the embodiments of the present disclosure, a method is performed by the network node 312 which is provided with service functions such as DPI and firewall. The network node 312 is configured to receive, from an IoT device (e.g., IoT device 301), data packets. The network node 312 is further configured to perform at least DPI on the received data packets, in order to identify sensor data from the received packets. This sensor data of an IoT application of the IoT device 301 is shown in FIG. 3. Sensor data may include timestamp, latitude, longitude, elevation, speed, direction vector, acceleration, pressure, temperature, humidity, light, radiation, etc.

The network node 312 is further configured to retrieve from the operator's system (i.e., OSS/BSS) 313 network data associated with the sensor data. Example of network data includes subscription data of the IoT device 310 that is managed and stored in the OSS/BSS (see FIG. 3). The network data may also include IP address, location, timestamp, timeouts, failures, latency, throughput, etc.

The network node 312 is further configured to retrieve, from third-party system 314, external data associated with the sensor data as shown in FIG. 3. Both the sensor data and the external data may be retrieved via the Internet, whereas the network data is retrieved from within the operator's network 310.

The network node 312 is further configured to combine the sensor data, the external data and the subscription data to form a combined data which is then stored in the blockchain database 310 (see FIG. 3).

The sensor data is thus enriched with network data and external data and stored in the block chain database 320. This combined data is then shared with each party that has access to the blockchain database 320. This provides the advantage that the full chronology of events (e.g., transactions) that take place are tracked, allowing any party to trace or audit prior transactions. Further, since sensor data can be shared among parties, the risk for making frauds is greatly reduced. In addition, by bringing sensor data, network data and external data on an operator network, the operator can act as a trusted party (authenticator of the data). Also, the sensor data and additional data which are stored in the blockchain database 320 allows the ecosystem participating parties to verify and audit sensor data and network data inexpensively (e.g., unbroken cold chain). As the blockchain database 320 contains the entire logged history of the transactions, each transaction processor of a party maintains its own local copy of this database and the consensus formation algorithms, provided by the blockchain, enable every copy to stay in sync.

As previously described, the network scenario is based on a SFC architecture which is combined with the blockchain technology. The SFC defines how network data can be routed between service functions. The SFC architecture includes at least one Service Classifier (SC) which may be integrated into existing network components, such as network node 312 of FIG. 3 or in a PGW (Packet Data network gateway of a mobile access network) or a BNG (Broadband Network gateway of a fixed access network). Classification is handled by a service classification function; initial classification occurs at the ingress to the SFC domain/architecture. SFC uses SDN to create a service chain of connected network services (such as FW, DPI, LI) and connect them in a virtual chain. This capability can be used by network operators to set up suites or catalogs of connected services that enable the use of a single network connection for many services, with different characteristics. Service Chaining is included in many SDN and NFV use cases and deployments, including data centers (chaining together virtual or physical network functions), carrier networks (services for SGi-LANs), and virtual customer edge, including virtual customer premises [vCPE] deployments). The SFC architecture also uses an NFV platform. An example of a SFC architecture wherein embodiments herein may be employed is shown in FIG. 4.

Figure 4:
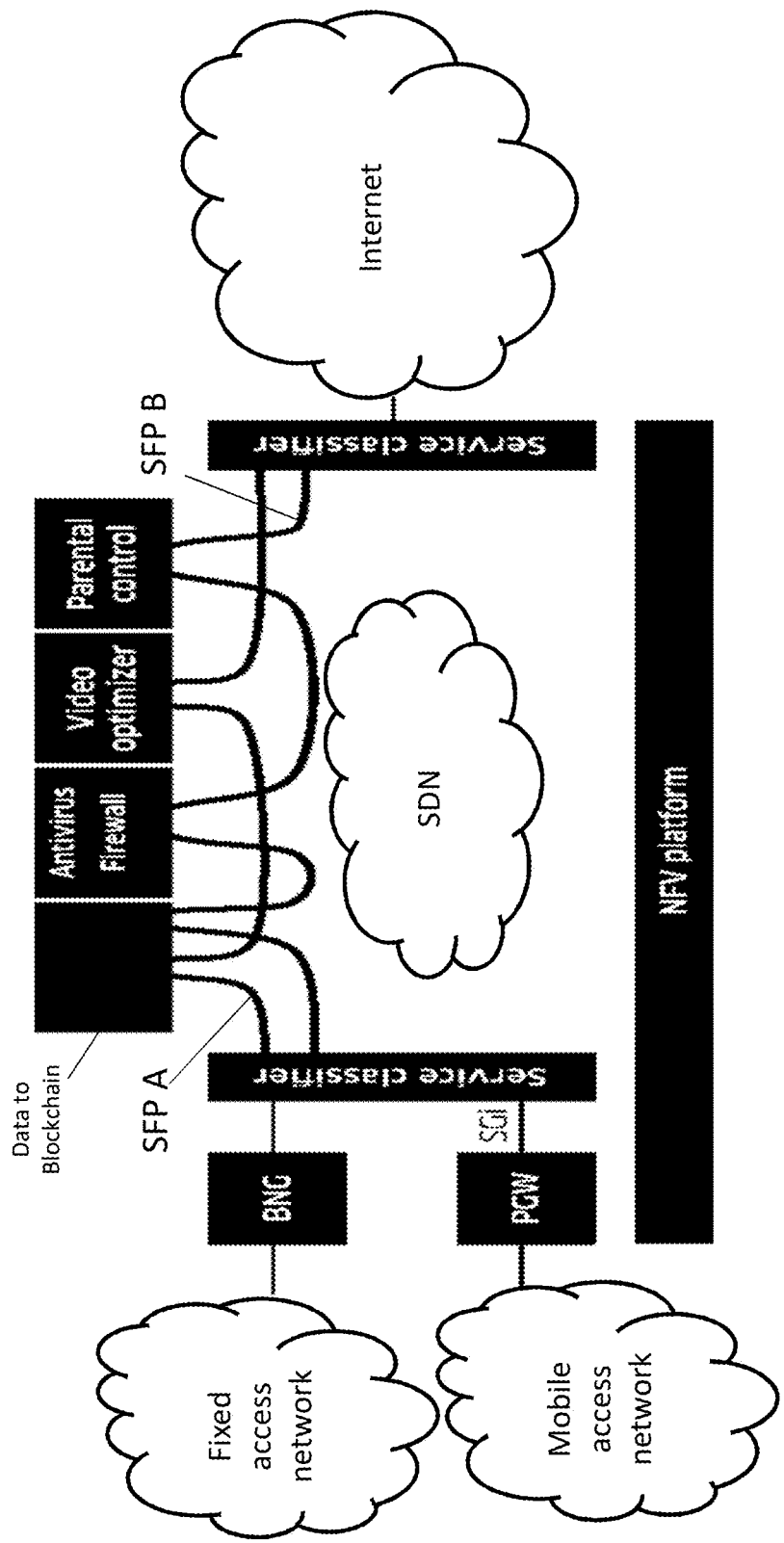
FIG. 4 illustrates an example of a SFC architecture.

Different paths are shown in FIG. 4. These paths are called Service Function Paths (SFP) and specify where packets assigned to a certain service function path must go. For instance, classification might be relatively coarse: all packets from this port are subject to, e.g., SFC policy X and directed into SFP A, or quite granular: all packets matching certain IP addresses are subject to SFC policy Y and directed into SFP B. It should be mentioned that the embodiments herein are not restricted to any particular SFP or SFP policy and also are not restricted in the way data is routed. FIG. 4 also shows the different functions that an SFC architecture may include, e.g., Antivirus Firewall, video optimizer, parental control and other service function mentioned earlier such as DPF and LI.

Figure 5:
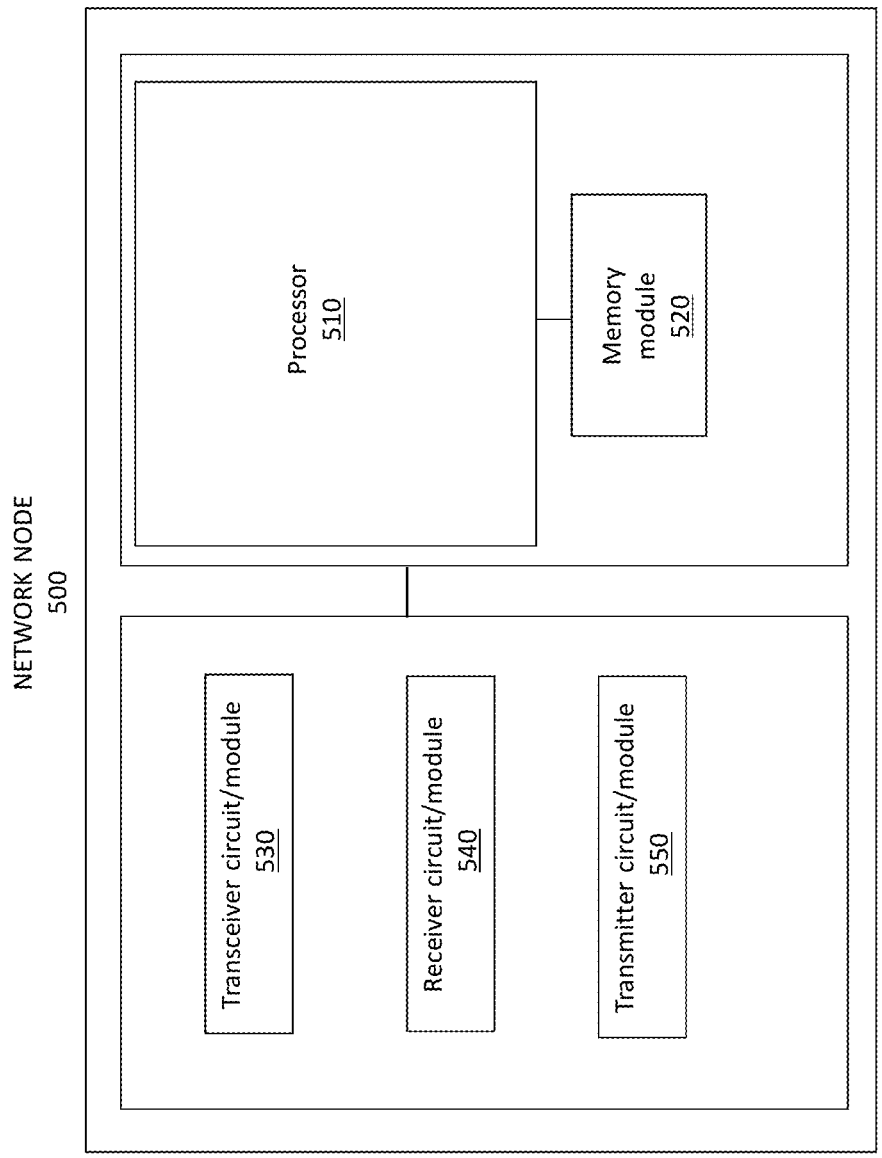
FIG. 5 illustrates a block diagram of an exemplary network node according to some embodiments herein.

The network node in FIG. 3 is configured to implement any of the SFC functions/service including DPI described above. FIG. 5 illustrates an exemplary block diagram of a network node 500. The network node 500 corresponds to NW NODE 312 in FIG. 3.

The network node 500 comprises processing circuitry or a processing module or a processor 510; a memory module 520; a receiver circuit or receiver module 540; a transmitter circuit or a transmitter module 550 and a transceiver circuit or a transceiver module 530 which may include transmitter circuit 550 and receiver circuit 540. The network node 500 may include additional components not depicted in FIG. 5.

The network node 500, by means of processor 510, is operative to: receive data packets from an IoT device; perform, by a service function in the network node, at least (DPI) on the received data packets for identifying sensor data of the received data packets; retrieve, from the operator's system, network data associated with the sensor data; retrieve, from a third party system, external data associated with the sensor data; combine the identified sensor data, the network data and the external data to form a combined data; and store the combined data in the blockchain database. The network node 500 is also operative to share the combined data with each party that has access to the blockchain database. Additional details regarding the type of data and functions of the network have already been described and need not be repeated again.

Figure 6:
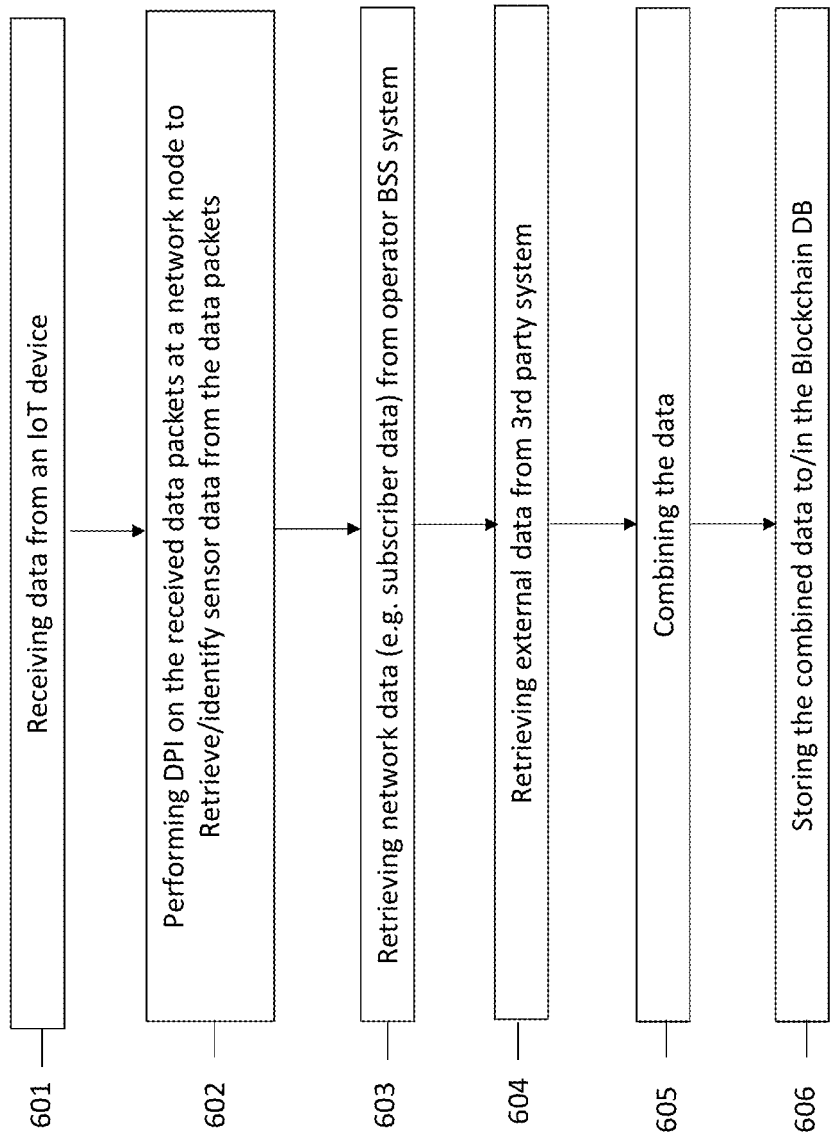
FIG. 6 illustrates a flowchart of a method performed by the network node according to embodiments herein.

Referring to FIG. 6 there is shown a flowchart of a method performed by a network node of an operator, for storage of data in a blockchain database in a network that is based on a Service SFC architecture, in accordance with previously described embodiments. As shown the method comprises:

(601) receiving data packets from an IoT device;

(602) performing, by a service function in the network node, at least DPI on the received data packets for identifying sensor data of the received data packets;

(603) retrieving, from the operator's system, network data associated with the sensor data;

(604) retrieving, from a third party system, external data associated with the sensor data;

(605) combining the identified sensor data, the network data and the external data to form a combined data; and (606) storing the combined data in the blockchain database.

As previously described, the method further comprises sharing the combined data with each party that has access to the blockchain database. Additional details regarding the type of data (sensor data, network data and external data) that is combined for storage in the blockchain database has already been described.

There is also provided a computer program comprising instructions which, when executed on at least one processor 510, cause the processor 510 to carry out the method described above. Also, a carrier containing the computer program is provided, wherein the carrier is one of a computer readable storage medium; an electronic signal, optical signal or a radio signal.

Several advantages can be achieved by the embodiments herein. An advantage is to enrich IoT generated sensor data with network data and external data and store the combined data in a blockchain database. This enable full chronology of events to be tracked, allowing parties having access the database to trace or audit prior transactions in a secure manner.

Another advantage is that sensor data, network data and external data can be shared among the parties making fraud more difficult since a blockchain facilitates secure online transactions.

In addition, by bringing sensor data, network data and external data on operator network, the operator can act as a trusted party (authenticator of the data). Also, the sensor data and additional data which are stored in the blockchain database allows the ecosystem participating parties to verify and audit sensor data and network data inexpensively (e.g., unbroken cold chain). As the blockchain database contains the entire logged history of the transactions, each transaction processor of a party maintains its own local copy of this database and the consensus formation algorithms, provided by the blockchain, enabling every copy to stay in sync.

Throughout this disclosure, the word "comprise" or "comprising" has been used in a non-limiting sense, i.e., meaning "consist at least of." Although specific terms may be employed herein, they are used in a generic and descriptive sense only and not for purposes of limitation.

The invention claimed is:

1. A method performed by a network node of an operator network, for storage of data in a blockchain database in a network that is based on a Service Function Chaining (SFC) architecture, the method comprising:
   receiving data packets from an IoT device;
   performing, by a service function in the network node of the operator network, at least deep packet inspection (DPI) on the received data packets for identifying IoT generated sensor data from the received data packets;
   retrieving, from an operator's system in the operator network, network data associated with the IoT generated sensor data;
   retrieving, from a third party system, via the Internet, external data associated with the IoT generated sensor data;
   combining the identified IoT generated sensor data, the network data and the external data to form a combined data;
   authenticating, by the operator network, the combined data, the operator network acting as a trusted party and authenticator of the combined data; and
   if authentication is successful, storing the combined data in the blockchain database.

2. The method according to claim 1, further comprising sharing the combined data with each party that has access to the blockchain database.

3. The method according to claim 1, wherein the IoT generated sensor data includes at least one of a timestamp, latitude, longitude, temperature, and humidity, and wherein the network data includes at least one of an IP address, location information, timestamp, latency information, and throughput.

4. The method according to claim 1, wherein the network data includes subscriber data related to a subscription of the IoT device and further includes at least one of an IP address, location information, timestamp, latency information, and throughput.

5. The method according to claim 1, wherein the external data includes location information.

6. The method according to claim 1, wherein the blockchain database is time-stamped and non-repudiable.

7. The method according to claim 2, wherein each party that has access to the blockchain database maintains a local copy of the combined data.

8. A network node of an operator network configured to store data in a blockchain database in a network that is based on a service function chaining (SFC) architecture, the network node comprising a processor and a memory containing instructions executable by the processor, wherein the network node is operative to:
   receive data packets from an IoT device;
   perform, by a service function in the network node of the operator network, at least deep packet inspection (DPI) on the received data packets for identifying IoT generated sensor data of from the received data packets;
   retrieve, from an operator's system in the operator network, network data associated with the IoT generated sensor data;
   retrieve, from a third party system via the Internet, external data associated with the IoT generated sensor data;
   combine the identified IoT generated sensor data, the network data and the external data to form a combined data;
   authenticate, by the operator network, the combined data, the operator network acting as a trusted party and authenticator of the combined data; and
   if authentication is successful, store the combined data in the blockchain database.

9. The network node according to claim 8, wherein the network node is operative to share the combined data with each party that has access to the blockchain database.

10. The network node according to claim 8 wherein the IoT generated sensor data includes at least one of a timestamp, latitude, longitude, temperature, and humidity, and wherein the network data includes at least one of an IP address, location information, timestamp, latency information, and throughput.

11. The network node according to claim 8, wherein the network data includes subscriber data related to a subscription of the IoT device and further includes at least one of an IP address, location information, timestamp, latency information, and throughput.

12. The network node according to claim 8, wherein the external data includes location information.

* * * * *